(12) United States Patent
Kawanago et al.

(10) Patent No.: US 12,365,054 B2
(45) Date of Patent: Jul. 22, 2025

(54) FLUX AND SOLDER PASTE

(71) Applicant: SENJU METAL INDUSTRY CO., LTD., Tokyo (JP)

(72) Inventors: Tomohisa Kawanago, Tokyo (JP); Yasuhiro Kajikawa, Tokyo (JP); Atsushi Ikeda, Tokyo (JP)

(73) Assignee: SENJU METAL INDUSTRY CO., LTD.

( * ) Notice: Subject to any disclaimer, the term of this patent is extended or adjusted under 35 U.S.C. 154(b) by 0 days.

(21) Appl. No.: 18/694,473

(22) PCT Filed: Oct. 4, 2022

(86) PCT No.: PCT/JP2022/037067
§ 371 (c)(1),
(2) Date: Mar. 22, 2024

(87) PCT Pub. No.: WO2023/063160
PCT Pub. Date: Apr. 20, 2023

(65) Prior Publication Data
US 2024/0326177 A1 Oct. 3, 2024

(30) Foreign Application Priority Data
Oct. 12, 2021 (JP) .................................. 2021-167300

(51) Int. Cl.
*B23K 35/362* (2006.01)
*B23K 35/02* (2006.01)

(52) U.S. Cl.
CPC .......... *B23K 35/362* (2013.01); *B23K 35/025* (2013.01)

(58) Field of Classification Search
CPC .................................................... B23K 35/362
See application file for complete search history.

(56) References Cited

U.S. PATENT DOCUMENTS

| | | | |
|---|---|---|---|
| 4,960,236 A | * | 10/1990 | Hedges ............. B23K 35/3618 228/180.1 |
| 2004/0069376 A1 | | 4/2004 | Saikawa et al. |
| 2019/0366487 A1 | | 12/2019 | Kawasaki et al. |
| 2021/0387292 A1 | | 12/2021 | Shirakawa et al. |

FOREIGN PATENT DOCUMENTS

| | | |
|---|---|---|
| CN | 101850483 A | 10/2010 |
| CN | 104923987 A | 9/2015 |
| CN | 109530971 A | 3/2019 |
| CN | 111989188 A | 11/2020 |

(Continued)

OTHER PUBLICATIONS

International Search Report for Application No. PCT/JP2022/037067, mailed Dec. 20, 2022 (6 pages).

(Continued)

*Primary Examiner* — Jophy S. Koshy
(74) *Attorney, Agent, or Firm* — NIXON PEABODY LLP; Jeffrey L. Costellia (57) ABSTRACT

A flux containing an organic acid (AC1), a solvent (S1), and a compound (AZ1) that has a benzotriazole skeleton is employed. AC1 has a rate of decrease in weight of 20% by mass or less in a case of being held at 140° C. for 15 minutes. S1 has a rate of decrease in weight of 50% by mass or less in a case of being held at 140° C. for 15 minutes.

6 Claims, 2 Drawing Sheets

(56) References Cited

FOREIGN PATENT DOCUMENTS

| | | | |
|---|---|---|---|
| CN | 112867583 | A | 5/2021 |
| EP | 0413540 | A2 | 2/1991 |
| JP | 03-088386 | A | 4/1991 |
| JP | 03-238195 | A | 10/1991 |
| JP | 08-155677 | A | 6/1996 |
| JP | 2002-361484 | A | 12/2002 |
| JP | 2003-225796 | A | 8/2003 |
| JP | 2004-058104 | A | 2/2004 |
| KR | 10-2019-0069426 | A | 6/2019 |
| KR | 10-2021-0077741 | A | 6/2021 |
| WO | 0238328 | A1 | 5/2002 |

OTHER PUBLICATIONS

LI Tao, et al, "Corrosion and Protection of SnAgCu Solder Powders in Organic Acid Solutions", Journal of Materials Protection, vol. 43, No. 01, pp. 13-15, Jan. 31, 2010.
Chinese Office Action for App. No. 202280068013.5, mailed Jul. 26, 2024 (22 pages).
Korean Office Action for App. No. 10-2024-7011606, mailed Aug. 15, 2024 (10 pages).

* cited by examiner

FLUX AND SOLDER PASTE

TECHNICAL FIELD

The present invention relates to a flux and a solder paste. Priority is claimed on Japanese Patent Application No. 2021-167300, filed Oct. 12, 2021, the content of which is incorporated herein by reference.

BACKGROUND ART

Fixing of components to a board and electrical connection of components to a board are generally performed by soldering. In soldering, a flux, a solder powder, and a solder paste in which a flux and a solder powder are mixed are used.

A flux has the effect of chemically removing metal oxides present on the metal surface of an object to be joined, which is a soldering target, and on a solder, thereby enabling the movement of metal elements at the boundary between the metal surface of the object to be joined and the solder. Therefore, by performing soldering using the flux, an intermetallic compound is formed between the metal surface of the object to be joined and the solder. Thereby, strong joining can be obtained.

In soldering, a method such as reflow soldering or thermal compression bonding (TCB) is employed depending on the size of the object to be joined, the type of the component, and the like.

In reflow soldering, first, a solder paste is printed on a board. Next, the component is mounted, and the board on which the component is mounted is heated in a heating furnace called a reflow furnace to perform soldering.

In the soldering by thermal compression bonding, first, a flux is applied to a board, and a solder is applied to a lead of a component. Next, the board is preheated at about 100° C., and then the component is mounted. Next, while heating the board on which the component is mounted to about 300° C., the component is subjected to thermal compression bonding to the board.

In any of the soldering, the surplus flux is removed by washing. The flux remaining even after washing is called a flux residue. In order to improve the reliability of joining between the solder and the object to be joined, it has been required to sufficiently wash the flux residues.

By the way, in general, the copper frame of the component is sealed with a resin before soldering of the component to the board. In this sealing step, the copper frame is heated and significantly oxidized. As a result, there is a problem in that the solder wettability to the copper frame is reduced.

On the other hand, for example, Patent Document 1 proposes a water-soluble flux including a polyvalent carboxylic acid compound and water, in which a residue can be easily washed with water and solder wettability is improved.

CITATION LIST

Patent Document

[Patent Document 1]
PCT International Publication No. WO 2002/038328

SUMMARY OF INVENTION

Technical Problem

However, in a case where soldering by thermal compression bonding is performed using the flux described in Patent Document 1, there is a concern that the activator in the flux may react with the copper frame to reduce the activity of the activator, and the solder wettability to the board may be reduced. In addition, in a case where soldering by thermal compression bonding is performed using the flux described in Patent Document 1, there is a concern that the copper frame may react with the ingredient of the flux to generate a metal salt, and the washability of the flux residue containing the metal salt may be reduced.

Here, the "washability of the flux residue" means the ease of removing the flux residue in a case where a washing agent is used.

An object of the present invention is to provide a flux and a solder paste in which both the solder wettability and the washability of flux residues are enhanced.

Solution to Problem

The present invention includes the following aspects.

A first aspect of the present invention is a flux containing a compound (AZ1) having a benzotriazole skeleton, an organic acid (AC1) having a rate of decrease in weight of 20% by mass or less in a case of being held at 140° C. for 15 minutes in a thermogravimetry, and a solvent (S1) having a rate of decrease in weight of 50% by mass or less in a case of being held at 140° C. for 15 minutes in a thermogravimetry.

In the flux according to the first aspect, the compound (AZ1) preferably includes one or more compounds selected from the group consisting of a compound represented by General Formula (AZ1-1) and a compound represented by General Formula (AZ1-2).

[In the formulae, $R^{11}$ represents an organic group or a hydrogen atom. $R^{12}$ represents a substituent. n1 represents an integer in a range of 0 to 4. $R^{21}$ represents an organic group or a hydrogen atom. $R^{22}$ represents a substituent. n2 represents an integer in a range of 0 to 4.]

In the flux according to the first aspect, a content of the compound (AZ1) is preferably 0.2% to 15% by mass with respect to a total mass (100% by mass) of the flux.

In the flux according to the first aspect, a content of the organic acid (AC1) is preferably 2% to 20% by mass with respect to a total mass (100% by mass) of the flux.

In the flux according to the first aspect, a proportion (mass ratio) of a content of the organic acid (AC1) with respect to a total amount of the compound (AZ1) is preferably 0.5 to 10.

The flux according to the first aspect further preferably contains an amine.

The flux according to the first aspect further preferably contains a thixotropic agent.

In addition, a second aspect of the present invention is a solder paste containing a solder alloy powder and the flux according to the first aspect.

Advantageous Effects of Invention

According to the present invention, it is possible to provide a flux and a solder paste in which both the solder wettability and the washability of flux residues are enhanced.

DESCRIPTION OF EMBODIMENTS (Flux)

The flux according to the present embodiment can be suitably used for both reflow soldering and soldering by thermal compression bonding. Among these, such flux can be more suitably used for soldering by thermal compression bonding.

The flux according to the present embodiment contains azoles (AZ), an organic acid (AC), and a solvent (S).

The azoles (AZ) include a compound (AZ1) having a benzotriazole skeleton. The organic acid (AC) includes an organic acid (AC1) in which a rate of decrease in weight in a case of being held at 140° C. for 15 minutes in a thermogravimetry is 20% by mass or less. The solvent (S) includes a solvent (S1) in which a rate of decrease in weight in a case of being held at 140° C. for 15 minutes in a thermogravimetry is 50% by mass or less.

<Azoles (AZ)>

In the present specification, the term "azoles" includes compounds having a heterocyclic 5-membered ring containing one or more nitrogen atoms.

Examples of the azoles include pyrrole, imidazoles, pyrazoles, 1,2,3-triazoles, 1,2,4-triazoles, tetrazoles, benzotriazoles, benzimidazoles, and the like.

<<Compound (AZ1) Having Benzotriazole Skeleton>>

The azoles (AZ) contained in the flux according to the present embodiment include a compound (AZ1) having a benzotriazole skeleton. In the present specification, the "compound having a benzotriazole skeleton" means a compound in which a heterocyclic 5-membered ring having three nitrogen atoms forms a fused ring together with a benzene ring. Hereinafter, the "compound (AZ1) having a benzotriazole skeleton" may be referred to as specific azoles (AZ1).

The specific azoles (AZ1) preferably include one or more compounds selected from the group consisting of a compound represented by General Formula (AZ1-1) and a compound represented by General Formula (AZ1-2).

(AZ1-1)

(AZ1-2)

[In the formulae, $R^{11}$ represents an organic group or a hydrogen atom. $R^{12}$ represents a substituent. n1 represents an integer in a range of 0 to 4. $R^{21}$ represents an organic group or a hydrogen atom. $R^{22}$ represents a substituent. n2 represents an integer in a range of 0 to 4.]

Compound Represented by General Formula (AZ1-1)

$R^{11}$ represents an organic group or a hydrogen atom, and preferably represents a hydrogen atom.

In a case where $R^{11}$ represents an organic group, examples of the organic group include a chain hydrocarbon group having 1 to 40 carbon atoms, which may have a substituent, an alicyclic hydrocarbon group having 3 to 40 carbon atoms, which may have a substituent, and $-R^{101}-N(R^{102a})(R^{102b})$.

Examples of the substituent include a carboxy group, a carbonyl group, a hydroxy group, an amino group, and a halogen atom.

In a case where $R^{11}$ is a chain hydrocarbon group, the chain hydrocarbon group may be linear or branched, but it is preferably branched. The chain hydrocarbon group is a saturated hydrocarbon group or an unsaturated hydrocarbon group, but is preferably a saturated hydrocarbon group.

In a case where $R^{11}$ is an alicyclic hydrocarbon group, the alicyclic hydrocarbon group may be a polycyclic group or a monocyclic group. The monocyclic alicyclic hydrocarbon group is preferably a group obtained by removing one or more hydrogen atoms from a monocycloalkane. The polycyclic alicyclic hydrocarbon group is preferably a group obtained by removing one or more hydrogen atoms from a polycycloalkane.

In a case where $R^{11}$ represents $-R^{101}-N(R^{102a})(R^{102b})$, $R^{101}$ may represent, for example, a hydrocarbon group having 1 to 5 carbon atoms. Examples of the hydrocarbon group as $R^{101}$ include a linear or branched aliphatic hydrocarbon group, and the number of carbon atoms is preferably 1 to 10, more preferably 1 to 6, still more preferably 1 to 4, and most preferably 1 to 3.

The linear aliphatic hydrocarbon group as $R^{101}$ is preferably a linear alkylene group, and specific examples thereof include a methylene group [$-CH_2-$], an ethylene group [$-(CH_2)_2-$], a trimethylene group [$-(CH_2)_3-$], a tetramethylene group [$-(CH_2)_4-$], a pentamethylene group [$-(CH_2)_5-$], and the like.

The branched aliphatic hydrocarbon group as $R^{101}$ is preferably a branched alkylene group, and specific examples thereof include alkylalkylene groups, for example, alkylmethylene groups such as $-CH(CH_3)-$, $-CH(CH_2CH_3)-$, $-C(CH_3)_2-$, $-C(CH_3)(CH_2CH_3)-$, $-C(CH_3)(CH_2CH_2CH_3)-$, and $-C(CH_2CH_3)_2-$; alkylethylene groups such as $-CH(CH_3)CH_2-$, $-CH(CH_3)CH(CH_3)-$, $-C(CH_3)_2CH_2-$, $-CH(CH_2CH_3)CH_2-$, and —C(CH$_3$)$_2$—CH$_2$—; alkyltrimethylene groups such as —CH(CH$_3$)CH$_2$CH$_2$— and —CH$_2$CH(CH$_3$)CH$_2$—; and alkyltetramethylene groups such as —CH(CH$_3$)CH$_2$CH$_2$CH$_2$— and —CH$_2$CH(CH$_3$)CH$_2$CH$_2$—.

R$^{102a}$ and R$^{102b}$ each independently may be, for example, a chain hydrocarbon group having 1 to 20 carbon atoms, which may have a substituent, or a hydrogen atom. Examples of the substituent include the above-described substituents.

In a case where R$^{102a}$ and R$^{102b}$ represent a chain hydrocarbon group, the chain hydrocarbon group may be linear or branched. The chain hydrocarbon group is a saturated hydrocarbon group or an unsaturated hydrocarbon group, but is preferably a saturated hydrocarbon group.

Examples of R$^{12}$ in General Formula (AZ1-1) include a hydrocarbon group having 1 to 5 carbon atoms, a carboxy group, a hydroxy group, an amino group, a halogen atom, and the like.

In a case where R$^{12}$ is a hydrocarbon group having 1 to 5 carbon atoms, the hydrocarbon group may be linear or branched. In addition, the hydrocarbon group may be a saturated hydrocarbon group or an unsaturated hydrocarbon group, and is preferably a saturated hydrocarbon group.

Examples of the hydrocarbon group as R$^{12}$ include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, and a neopentyl group, and a methyl group is preferable.

Examples of the halogen atom as R$^{12}$ include a fluorine atom, a chlorine atom, a bromine atom, and an iodine atom.

In a case where n1 is 2 or more, a plurality of R$^{12}$'s may be the same as or different from each other. n1 represents preferably 0 or 1.

Examples of the compound represented by General Formula (AZ1-1) include 1,2,3-benzotriazole, 5-methylbenzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, and the like, and among these, one or more selected from the group consisting of 1,2,3-benzotriazole and 5-methylbenzotriazole is preferable, and 1,2,3-benzotriazole is more preferable.

1,2,3-benzotriazole is a compound represented by Chemical Formula (AZ1-1-1), and the CAS number thereof is 95-14-7.

(AZ1-1-1)

5-Methylbenzotriazole is a compound represented by Chemical Formula (AZ1-1-2) and the CAS number thereof is 136-85-6.

(AZ1-1-2)

Compound Represented by General Formula (AZ1-2)

R$^{21}$ represents an organic group or a hydrogen atom. In a case where R$^{21}$ represents an organic group, examples of the organic group include an aromatic hydrocarbon group which may have a substituent, a chain hydrocarbon group having 1 to 40 carbon atoms, which may have a substituent, and an alicyclic hydrocarbon group having 3 to 40 carbon atoms, which may have a substituent, and an aromatic hydrocarbon group is preferable.

The description of the chain hydrocarbon group and the alicyclic hydrocarbon group as R$^{21}$ is the same as the description of the chain hydrocarbon group and the alicyclic hydrocarbon group as R$^{11}$ described above.

The aromatic hydrocarbon group is a hydrocarbon group having at least one aromatic ring, and examples thereof include an aromatic hydrocarbon ring such as benzene, naphthalene, anthracene, and phenanthrene; an aromatic heterocyclic ring in which some of the carbon atoms constituting an aromatic hydrocarbon ring are substituted with heteroatoms; and a fused ring in which an aromatic hydrocarbon ring and an aromatic heterocyclic ring are fused.

In a case where the aromatic hydrocarbon group as R$^{21}$ has a substituent, examples of the substituent include a hydrocarbon group having 1 to 20 carbon atoms, an aromatic hydrocarbon group, a carboxy group, a hydroxy group, an amino group, and a halogen atom, among which a hydrocarbon group or a hydroxy group is preferable. In a case where the substituent is a hydrocarbon group, examples of the hydrocarbon group include the same groups as those for the hydrocarbon group as R$^{11}$. In a case where the substituent is an aromatic hydrocarbon group, examples of the aromatic hydrocarbon group include those described above.

Examples of R$^{22}$ in General Formula (AZ1-2) include the same one as R$^{12}$ in General Formula (AZ1-1).

The compound represented by General Formula (AZ1-2) may have a plurality of benzotriazole skeletons. Here, the plurality is, for example, 2 to 5, and is preferably 2.

Examples of the compound represented by General Formula (AZ1-2) include 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], and 6-(2-benzotriazolyl)-4-tert-octyl-6'-tert-butyl-4'-methyl-2,2'-methylenebisphenol, and among these, 2-(2'-hydroxy-5'-methylphenyl)benzotriazole is preferable.

2-(2'-hydroxy-5'-methylphenyl)benzotriazole is a compound represented by Chemical Formula (AZ1-2-1), and the CAS number thereof is 2440-22-4.

(AZ1-2-1)

One compound (AZ1) having a benzotriazole skeleton may be used singly or two or more compounds (AZ1) may be mixed and used.

The specific azoles (AZ1) are preferably one or more selected from the group consisting of 1,2,3-benzotriazole, 2-(2'-hydroxy-5'-methylphenyl)benzotriazole, and 5-methylbenzotriazole.

The content of the compound (AZ1) having a benzotriazole skeleton in the flux is preferably 0.2% by mass or more and 15% by mass or less, and more preferably 0.5% by mass or more and 10% by mass or less with respect to the total amount (100% by mass) of the flux.

In a case where the content of the specific azoles (AZ1) is within the above-described preferred range, the wettability of the flux can be further enhanced, and the washability of the flux residue can be further enhanced.

<<Other Azoles>>

The flux according to the present embodiment may contain other azoles other than the compound (AZ1) having a benzotriazole skeleton.

Examples of the other azoles include pyrroles, imidazoles, pyrazoles, 1,2,4-triazoles, tetrazoles, benzimidazoles, and the like.

Examples of the imidazoles include 2-methylimidazole, 2-ethylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, a 2-phenylimidazole isocyanuric acid adduct, 2-phenyl-4,5-dihydroxymethylimidazole, 2-phenyl-4-methyl-5-hydroxymethylimidazole, 2-methylimidazoline, 2-phenylimidazoline, an epoxy-imidazole adduct, 1-dodecyl-2-methyl-3-benzylimidazolium chloride, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, and the like.

Examples of the 1,2,4-triazoles include 1,2,4-triazole, and the like.

Examples of the tetrazoles include 5-phenyltetrazole, and the like.

Examples of the benzimidazoles include benzimidazole, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, 2,3-dihydro-1H-pyrrolo[1,2-a]benzimidazole, and the like.

One other azoles may be used singly or two or more other azoles may be mixed and used.

The total content of the azoles (AZ) in the flux is preferably 0.2% by mass or more and 15% by mass or less and more preferably 0.5% by mass or more and 10% by mass or less with respect to the total amount (100% by mass) of the flux.

The content of the specific azoles (AZ1) in the flux may be 50% by mass or more and 100% by mass or less, 60% by mass or more and 100% by mass or less, 70% by mass or more and 100% by mass or less, 80% by mass or more and 100% by mass or less, 90% by mass or more and 100% by mass or less, or 100% by mass with respect to the total amount (100% by mass) of the azoles (AZ).

In a case where the content of the specific azoles (AZ1) is equal to or more than the above-described lower limit value, the wettability of the flux can be further enhanced.

<Organic Acid (AC)>
<<Specific Organic Acid (AC1)>>

The organic acid (AC) contained in the flux according to the present embodiment includes a specific organic acid (AC1). The specific organic acid (AC1) has a rate of decrease in weight of 20% by mass or less in a case of being held at 140° C. for 15 minutes in a thermogravimetry. The rate of decrease in weight of the specific organic acid (AC1) is preferably 15% by mass or less, more preferably 10% by mass or less, still more preferably 5% by mass or less, and particularly preferably 3% by mass or less, and may be less than 1% by mass. The rate of decrease in weight of the specific organic acid (AC1) is preferably as low as possible. The lower limit value of the rate of decrease in weight of the specific organic acid (AC1) is not particularly limited as long as the effects of the present invention are exhibited, and may be 0.1% by mass or may be 0% by mass in measurement.

In the present invention, the "rate of decrease in weight" is measured as follows, for example. Using a simultaneous thermogravimetric differential thermal analyzer (TG-DTA8122 manufactured by Rigaku Corporation), 10 mg of a sample to be measured is put in an aluminum pan, and heating is started from a room temperature of about 25° C., the temperature is raised to 140° C. at 1° C./sec, and the temperature is held at 140° C. for 15 minutes. Then, the rate of decrease in weight is calculated from the mass (100% by mass) of the target sample before heating and the mass after holding at 140° C. for 15 minutes by the following calculation formula.

Rate of decrease in weight (%)=100×{(mass of target sample before heating)−(mass after holding at 140° C. for 15 minutes)}/(mass of target sample before heating)

Examples of the specific organic acid (AC1) include an aliphatic dicarboxylic acid having 4 to 10 carbon atoms.

Examples of the aliphatic dicarboxylic acid having 4 to 10 carbon atoms include succinic acid, glutaric acid, adipic acid, pimelic acid, suberic acid, azelaic acid, sebacic acid, diglycolic acid, malic acid, tartaric acid, and the like.

In addition, examples of the specific organic acid (AC1) include 2,2-bishydroxymethylpropionic acid, 2,2-bishydroxymethylbutyric acid, citric acid, β-hydroxyisovaleric acid, 2-hydroxy-2-methylbutyric acid, hydroxypivalic acid, 3-hydroxy-3-methylvaleric acid, leucic acid, and the like.

One specific organic acid (AC1) may be used singly or two or more specific organic acids (AC1) may be mixed and used.

The specific organic acid (AC1) is preferably one or more selected from the group consisting of succinic acid, glutaric acid, adipic acid, pimelic acid, suberic acid, azelaic acid, sebacic acid, diglycolic acid, thioglycolic acid, dithioglycolic acid, thiodiglycolic acid, malic acid, tartaric acid, 2,2-bishydroxymethylpropionic acid, 2,2-bishydroxymethylbutyric acid, citric acid, β-hydroxyisovaleric acid, 2-hydroxy-2-methylbutyric acid, hydroxypivalic acid, 3-hydroxy-3-methylvaleric acid, and leucic acid.

The specific organic acid (AC1) is more preferably one or more selected from the group consisting of diglycolic acid and citric acid.

The content of the specific organic acid (AC1) in the flux is preferably 2% by mass or more and 20% by mass or less and more preferably 2.5% by mass or more and 15% by mass or less with respect to the total amount (100% by mass) of the flux.

In a case where the content of the specific organic acid (AC1) is equal to or more than the above-described lower limit value, the wettability of the flux can be further enhanced. In a case where the content of the specific organic acid (AC1) is equal to or less than the above-described upper limit value, the washability of the flux residues can be further enhanced.

<<Other Organic Acids>>

The organic acid (AC) may include other organic acids other than the specific organic acid (AC1).

Examples of the other organic acids include eicosanedioic acid, glycolic acid, salicylic acid, dipicolinic acid, dibutylaniline diglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tris(2-carboxyethyl) isocyanuric acid, glycine, 1,3-cyclohexanedicarboxylic acid, 2,3-dihydroxybenzoic acid, 2,4-diethylglutaric acid, 2-quinolinecarboxylic acid, 3-hydroxybenzoic acid, propionic acid, p-anisic acid, stearic acid, 12-hydroxystearic acid, oleic acid, linoleic acid, linolenic acid, palmitic acid, and the like.

In addition, examples of the other organic acids include a dimer acid, a trimer acid, a hydrogenated dimer acid which is a hydrogenated product obtained by adding hydrogen to a dimer acid, a hydrogenated trimer acid which is a hydrogenated product obtained by adding hydrogen to a trimer acid, and the like.

Examples of the dimer acid and the trimer acid include dimer acid which is the reaction product of oleic acid and linoleic acid, trimer acid which is the reaction product of oleic acid and linoleic acid, dimer acid which is the reaction product of acrylic acid, trimer acid which is the reaction product of acrylic acid, dimer acid which is the reaction product of methacrylic acid, trimer acid which is the reaction product of methacrylic acid, dimer acid which is the reaction product of acrylic acid and methacrylic acid, trimer acid which is the reaction product of acrylic acid and methacrylic acid, dimer acid which is the reaction product of oleic acid, trimer acid which is the reaction product of oleic acid, dimer acid which is the reaction product of linoleic acid, trimer acid which is the reaction product of linoleic acid, dimer acid which is the reaction product of linolenic acid, trimer acid which is the reaction product of linolenic acid, dimer acid which is the reaction product of acrylic acid and oleic acid, trimer acid which is the reaction product of acrylic acid and oleic acid, dimer acid which is the reaction product of acrylic acid and linoleic acid, trimer acid which is the reaction product of acrylic acid and linoleic acid, dimer acid which is the reaction product of acrylic acid and linolenic acid, trimer acid which is the reaction product of acrylic acid and linolenic acid, dimer acid which is the reaction product of methacrylic acid and oleic acid, trimer acid which is the reaction product of methacrylic acid and oleic acid, dimer acid which is the reaction product of methacrylic acid and linoleic acid, trimer acid which is the reaction product of methacrylic acid and linoleic acid, dimer acid which is the reaction product of methacrylic acid and linolenic acid, trimer acid which is the reaction product of methacrylic acid and linolenic acid, dimer acid which is the reaction product of oleic acid and linolenic acid, trimer acid which is the reaction product of oleic acid and linolenic acid, dimer acid which is the reaction product of linoleic acid and linolenic acid, trimer acid which is the reaction product of linoleic acid and linolenic acid, hydrogenated dimer acid which is the hydrogenated product of each of the above-mentioned dimer acids, and hydrogenated trimer acid which is the hydrogenated product of each of the above-mentioned trimer acid.

For example, dimer acid, which is the reaction product of oleic acid and linoleic acid, is a dimer having 36 carbon atoms. In addition, trimer acid, which is the reaction product of oleic acid and linoleic acid, is a trimer having 54 carbon atoms. One other organic acid may be used singly or two or more other organic acids may be mixed and used.

The total content of the organic acid (AC) in the flux is preferably 2% by mass or more and 20% by mass or less and more preferably 2.5% by mass or more and 15% by mass or less with respect to the total amount (100% by mass) of the flux.

The content of the specific organic acid (AC1) in the flux is preferably 50% by mass or more and 100% by mass or less with respect to the total amount (100% by mass) of the organic acid (AC).

In a case where the content of the specific organic acid (AC1) is equal to or more than the above-described lower limit value, the wettability of the flux can be further enhanced.

The mixing ratio of the specific organic acid (AC1) and the specific azoles (AZ1) is preferably 0.3 to 25 and more preferably 0.5 to 10, as a mass ratio represented by specific organic acid (AC1)/specific azoles (AZ1), that is, a proportion of the total amount of the specific organic acid (AC1) to the total amount of the specific azoles (AZ1).

In a case where the mass ratio of the specific organic acid (AC1) to the specific azoles (AZ1) is within the above-described range, the wettability of the flux can be enhanced, and the washability of the flux residue can be further enhanced.

<Solvent(S)>
<<Specific Solvent (S1)>>

The solvent (S) contained in the flux according to the present embodiment includes a specific solvent (S1).

The specific solvent (S1) has a rate of decrease in weight of 50% by mass or less in a case of being held at 140° C. for 15 minutes in a thermogravimetry. The rate of decrease in weight of the specific solvent (S1) is preferably 40% by mass or less, more preferably 30% by mass or less, still more preferably 20% by mass or less, and particularly preferably 10% by mass or less. The rate of decrease in weight of the specific solvent (S1) is preferably as low as possible. The lower limit value of the rate of decrease in weight of the specific solvent (S1) is not particularly limited as long as the effects of the present invention are exhibited, and may be 0.1% by mass or may be 0% by mass in measurement.

Examples of the specific solvent (S1) include alcohol-based solvents, glycol-based solvents, glycol ether-based solvents, polyalkylene glycols, and the like.

Examples of the alcohol-based solvent include 2,4-diethyl-1,5-pentanediol (338° C.), 1,4-cyclohexanediol (252° C.), and the like.

Examples of the glycol ether-based solvent include diethylene glycol mono-2-ethylhexyl ether (275° C.), diethylene glycol monohexyl ether (255° C.), diethylene glycol dibutyl ether (256° C.), triethylene glycol monobutyl ether (278° C.), tetraethylene glycol dimethyl ether (275° C.), and the like.

The boiling point of each solvent is shown in the parentheses. In the present specification, the boiling point means a temperature of a liquid when a saturated vapor pressure of the target liquid is equal to 1 atm (that is, 1,013 hPa).

Examples of the polyalkylene glycols include a polymer of alkylene oxide, an adduct obtained by additively polymerizing alkylene oxide with alcohol, an adduct obtained by additively polymerizing alkylene oxide with carboxylic acid, an adduct obtained by additively polymerizing alkylene oxide with amide, and the like.

More specifically, examples of the polyalkylene glycols include polyalkylene glycols such as polyethylene glycol, an ethylene oxide-resorcin copolymer, a polyoxyethylene glyceryl ether, polyoxyalkylene acetylene glycols, a polyoxyalkylene glyceryl ether, a polyoxyalkylene alkyl ether, a polyoxyalkylene ester, a polyoxyalkylene alkylamide, an aliphatic alcohol polyoxyethylene adduct, an aromatic alcohol polyoxyethylene adduct, and a polyhydric alcohol polyoxyethylene adduct.

The alkylene oxide may be one or more selected from the group consisting of ethylene oxide, propylene oxide, and butylene oxide, and ethylene oxide is preferable.

One specific solvent (S1) may be used singly or two or more specific solvents (S1) may be mixed and used.

The specific solvent (S1) is preferably one or more selected from the group consisting of an alcohol-based solvent, a glycol-based solvent, a glycol ether-based solvent, and polyalkylene glycols, more preferably one or more selected from the group consisting of an alcohol-based solvent (excluding a terpineol), a glycol-based solvent, a glycol ether-based solvent, and polyalkylene glycols, still more preferably polyalkylene glycols, particularly preferably one or more selected from the group consisting of a polymer of alkylene oxide, an adduct obtained by additively polymerizing alkylene oxide with alcohol, an adduct obtained by additively polymerizing alkylene oxide with carboxylic acid, and an adduct obtained by additively polymerizing alkylene oxide with amide, and most preferably one or more selected from the group consisting of polyethylene glycol, an ethylene oxide-resorcin copolymer, a polyoxyethylene glyceryl ether, polyoxyalkylene acetylene glycols, a polyoxyalkylene glyceryl ether, a polyoxyalkylene alkyl ether, a polyoxyalkylene ester, a polyoxyalkylene alkylamide, an aliphatic alcohol polyoxyethylene adduct, an aromatic alcohol polyoxyethylene adduct, and a polyhydric alcohol polyoxyethylene adduct.

The specific solvent (S1) is more preferably one or more selected from the group consisting of polyethylene glycol and an ethylene oxide-resorcin copolymer.

In a case where S1 is polyethylene glycol, the molecular weight of the polyethylene glycol is 1,500 or less, preferably 200 or more and 1,500 or less, more preferably 200 or more and 1,000 or less, and still more preferably 200 or more and 600 or less.

The content of the specific solvent (S1) in the flux is preferably 15% by mass or more and 95% by mass or less, and more preferably 25% by mass or more and 75% by mass or less with respect to the total amount (100% by mass) of the flux.

<<Other Solvents>>

The solvent (S) may contain other solvents other than the specific solvent (S1).

Examples of the other solvents include other alcohol-based solvents, other glycol-based solvents, and terpineols.

Examples of the other alcohol-based solvents include isopropyl alcohol, 1,2-butanediol (192° C.), 2,2-dimethyl-1,3-propanediol (210° C.), 2,5-dimethyl-2,5-hexanediol (215° C.), 2,5-dimethyl-3-hexyne-2,5-diol (206° C.), 2,3-dimethyl-2,3-butanediol (174° C.), 1-ethynyl-1-cyclohexanol (180° C.), and the like.

Examples of other glycol ether-based solvents include hexylene glycol (197° C.), 1,3-butylene glycol (203° C.), and the like.

Examples of the terpineols include α-terpineol (217° C.), β-terpineol (210° C.), γ-terpineol (218° C.), a terpineol mixture (that is, a mixture containing α-terpineol as a main ingredient and β-terpineol or γ-terpineol), and the like.

The boiling point of each solvent is shown in the parentheses.

One other solvent may be used singly or two or more other solvents may be mixed and used.

The total content of the solvent (S) in the flux is preferably 15% by mass or more and 95% by mass or less, and more preferably 25% by mass or more and 75% by mass or less with respect to the total amount (100% by mass) of the flux.

The content of the specific solvent (S1) in the flux is preferably 50% by mass or more and 100% by mass or less with respect to the total content (100% by mass) of the solvent (S).

In a case where the proportion of the content of the specific solvent (S1) is equal to or more than the above-described lower limit value, the wettability of the flux can be further enhanced, and the washability of the flux residue can be further enhanced.

<Other Ingredients>

The flux in the present embodiment may contain other ingredients as necessary, in addition to the azoles (AZ), the organic acid (AC), and the solvent (S).

Examples of the other ingredients include other activators other than the azoles (AZ) and the organic acids (AC), water-soluble base agents, metal deactivators, surfactants, silane coupling agents, antioxidants, and the like.

<<Other Activators>>

Examples of the other activators include amines, halogen compounds, and the like.

Amine:

Examples of the amines include guanidines, triazines, alkylamine compounds, aminoalcohol compounds, amine-polyoxyalkylene adducts, and the like.

Examples of the guanidines include 1,3-diphenylguanidine, 1,3-di-o-tolylguanidine, 1-o-tolylbiguanide, 1,3-di-o-cumenylguanidine, 1,3-di-o-cumenyl-2-propionylguanidine, and the like.

Examples of the triazines include 2,4-diamino-6-vinyl-s-triazine, 2,4-diamino-6-vinyl-s-triazine isocyanuric acid adduct, 2,4-diamino-6-methacryloyloxyethyl-s-triazine, and the like.

Examples of the alkylamine compounds include ethylamine, triethylamine, ethylenediamine, triethylenetetramine, cyclohexylamine, hexadecylamine, stearylamine, and the like.

Examples of the aminoalcohol compound include N,N,N',N'-tetrakis(2-hydroxypropyl)ethylenediamine, diethanolamine, triethanolamine, diisopropanolamine, triisopropanolamine, and the like.

Examples of the amine-polyoxyalkylene adducts include diamine-terminated polyalkylene glycols, aliphatic amine-polyoxyalkylene adducts, aromatic amine-polyoxyalkylene adducts, polyvalent amine-polyoxyalkylene adducts, and the like.

Examples of alkylene oxides from which the amine-polyoxyalkylene adducts are derived include ethylene oxides, propylene oxides, butylene oxides, and the like.

The diamine-terminated polyalkylene glycol is a compound in which both terminals of polyalkylene glycol are aminated.

Examples of the diamine-terminated polyalkylene glycols include diamine-terminated polyethylene glycols, diamine-terminated polypropylene glycols, diamine-terminated polyethylene glycol-polypropylene glycol copolymers, and the like.

Examples of the diamine-terminated polyethylene glycol-polypropylene glycol copolymers include a bis(2-aminopropyl)ether polyethylene glycol-polypropylene glycol copolymer and a bis(2-aminoethyl)ether polyethylene glycol-polypropylene glycol copolymer.

The aliphatic amine-polyoxyalkylene adducts, the aromatic amine-polyoxyalkylene adducts, and the polyvalent amine-polyoxyalkylene adducts are those in which polyoxyalkylene groups are bonded to the nitrogen atoms of amines. Examples of the amine include ethylenediamine, 1,3-propanediamine, 1,4-butanediamine, hexamethylenediamine, methaxylenediamine, tolylenediamine, paraxylenediamine, phenylenediamine, isophoronediamine, 1,10-decanediamine, 1,12-dodecanediamine, 4,4-diaminodicyclohexylmethane, 4,4-diaminodiphenylmethane, butane-1,1,4,4-tetraamine, pyrimidine-2,4,5,6-tetraamine, and the like.

Examples of the aliphatic amine-polyoxyalkylene adduct include a polyoxyalkylene alkylamine. Examples of the polyoxyalkylene alkylamine include polyoxyalkylene ethylenediamine. The polyoxyalkylene ethylenediamine is a compound in which at least one polyoxyalkylene group is bonded to any nitrogen atom of ethylenediamine. Examples of the polyoxyalkylene ethylenediamine include polyoxyethylene ethylenediamine, polyoxypropylene ethylenediamine, and polyoxyethylene polyoxypropylene ethylenediamine. The polyoxyethylene ethylenediamine is a compound in which one or more polyoxyethylene groups are bonded to any of the nitrogen atoms of ethylenediamine, and the polyoxypropylene ethylenediamine is a compound in which one or more polyoxypropylene groups are bonded to any of the nitrogen atoms of ethylenediamine. The polyoxyethylene polyoxypropylene ethylenediamine is a compound in which at least one polyoxypropylene group or polyoxyethylene group is bonded to any nitrogen atom of ethylenediamine.

Examples of the polyoxyalkylene ethylenediamine include N-polyoxypropylene ethylenediamine, N-polyoxyethylene ethylenediamine, N-polyoxyethylene polyoxypropylene ethylenediamine, and the like.

Alternatively, the amine is an amine in which a rate of decrease in weight in a case of being held at 140° C. for 15 minutes in a thermogravimetry is preferably 20% by mass or less, more preferably 15% by mass or less, and still more preferably 10% by mass. The lower limit value of the rate of decrease in weight of the amine is not particularly limited as long as the effects of the present invention are exhibited, and may be 0.1% by mass or may be 0% by mass in measurement.

One amine may be used singly or two or more amines may be mixed and used.

The amine is preferably one or more selected from the group consisting of an aminoalcohol compound and an amine-polyoxyalkylene adduct.

As the aminoalcohol compound, N,N,N',N'-tetrakis(2-hydroxypropyl)ethylenediamine is preferable.

As the amine-polyoxyalkylene adduct, a diamine-terminated polyalkylene glycol is preferable, a diamine-terminated polyethylene glycol-polypropylene glycol copolymer is more preferable, and a bis(2-aminopropyl)ether polyethylene glycol-polypropylene glycol copolymer is still more preferable.

A content of the amine in the flux is preferably 0% by mass or more and 70% by mass or less, and more preferably 20% by mass or more and 60% by mass or less with respect to the total amount (100% by mass) of the flux.

In a case where the content of the amine is equal to or more than the above-described lower limit value, the wettability of the flux can be further enhanced. In a case where the content of the amine is equal to less than the above-described upper limit value, the washability of the flux residue can be further enhanced.

Halogen Compound:

Examples of the halogen compounds include amine hydrohalic acid salts, and organic halogen compounds other than amine hydrohalic acid salts.

An amine hydrohalic acid salt is a compound obtained by reacting an amine with a hydrogen halide.

Examples of the amines here include the amines shown in <<Amine>> as examples and the azoles shown in Azoles (AZ) as examples.

Examples of the hydrogen halide include hydrides of chlorine, bromine, and iodine.

More specifically, examples of the amine hydrohalic acid salts include cyclohexylamine hydrobromide, hexadecylamine hydrobromide, stearylamine hydrobromide, ethylamine hydrobromide, diphenylguanidine hydrobromide, ethylamine hydrochloride, stearylamine hydrochloride, diethylaniline hydrochloride, diethanolamine hydrochloride, 2-ethylhexylamine hydrobromide, pyridine hydrobromide, isopropylamine hydrobromide, diethylamine hydrobromide, dimethylamine hydrobromide, dimethylamine hydrochloride, rosinamine hydrobromide, 2-ethylhexylamine hydrochloride, isopropylamine hydrochloride, cyclohexylamine hydrochloride, 2-pipecoline hydrobromide, 1,3-diphenylguanidine hydrochloride, dimethylbenzylamine hydrochloride, hydrazine hydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosinamine hydrobromide, 2-phenylimidazole hydrobromide, 4-benzylpyridine hydrobromide, L-glutamic acid hydrochloride, N-methylmorpholine hydrochloride, betaine hydrochloride, 2-pipecoline hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosinamine hydrofluoride, cyclohexylamine tetrafluoroborate, and dicyclohexylamine tetrafluoroborate.

In addition, as the halogen compound, for example, a salt obtained by reacting an amine with tetrafluoroboric acid ($HBF_4$), and a complex obtained by reacting an amine with boron trifluoride ($BF_3$) can also be used.

Examples of the complex include boron trifluoride piperidine and the like.

Examples of the organic halogen compounds other than the amine hydrohalic acid salts include halogenated aliphatic compounds. The halogenated aliphatic hydrocarbon group refers to one in which a part or all of hydrogen atoms constituting the aliphatic hydrocarbon group are substituted with halogen atoms.

Examples of the halogenated aliphatic compound include halogenated aliphatic alcohols and halogenated heterocyclic compounds.

Examples of the halogenated aliphatic alcohols include 1-bromo-2-propanol, 3-bromo-1-propanol, 3-bromo-1,2-propanediol, 1-bromo-2-butanol, 1,3-dibromo-2-propanol, 2,3-dibromo-1-propanol, 1,4-dibromo-2-butanol, trans-2,3-dibromo-2-butene-1,4-diol, and the like.

Examples of the halogenated heterocyclic compounds include a compound represented by General Formula (1).

$$R^{31}-(R^{32})_n \quad (1)$$

[In the formula, $R^{31}$ represents an n-valent heterocyclic group. $R^{32}$ represents a halogenated aliphatic hydrocarbon group.]

Examples of heterocyclic rings of the n-valent heterocyclic group as $R^{31}$ include a ring structure in which a part of carbon atoms constituting an aliphatic hydrocarbon or an aromatic hydrocarbon ring is substituted with a heteroatom. Examples of the heteroatom in this heterocyclic ring include an oxygen atom, a sulfur atom, a nitrogen atom, and the like. This heterocyclic ring is preferably a 3- to 10-membered ring, and more preferably a 5- to 7-membered ring. Examples of this heterocyclic ring include an isocyanurate ring.

The halogenated aliphatic hydrocarbon group as $R^{32}$ preferably has 1 to 10 carbon atoms, more preferably 2 to 6 carbon atoms, and further preferably 3 to 5 carbon atoms. In addition, $R^{32}$ is preferably a brominated aliphatic hydrocarbon group or a chlorinated aliphatic hydrocarbon group, more preferably a brominated aliphatic hydrocarbon group, and further preferably a brominated saturated aliphatic hydrocarbon group.

Examples of the halogenated heterocyclic compounds include tris-(2,3-dibromopropyl)isocyanurate.

Examples of the organic halogen compounds other than the amine hydrohalic acid salts further include halogenated carboxyl compounds such as carboxyl iodide compounds such as 2-iodobenzoic acid, 3-iodobenzoic acid, 2-iodopropionic acid, 5-iodosalicylic acid, 5-iodoanthranilic acid; carboxyl chloride compounds such as 2-chlorobenzoic acid and 3-chloropropionic acid; and brominated carboxyl compounds such as 2,3-dibromopropionic acid, 2,3-dibromosuccinic acid, and 2-bromobenzoic acid.

One halogen compound may be used singly or two or more halogen compounds may be mixed and used.

<<Water-Soluble Base Agent>>

Examples of the water-soluble base agent include nonionic surfactants and the like.

Examples of the nonionic surfactant include polyethylene glycol and the like.

One water-soluble base agent may be used singly or two or more water-soluble base agents may be mixed and used.

The water-soluble base agent is preferably polyethylene glycol.

In a case where the water-soluble base agent is polyethylene glycol, the molecular weight of the polyethylene glycol is preferably more than 1,500 and 6,000 or less, more preferably 2,000 or more and 6,000 or less, and still more preferably 3,000 or more and 5,000 or less.

The content of the water-soluble base agent is preferably 0% by mass or more and 30% by mass or less and more preferably 0% by mass or more and 20% by mass or less with respect to the total mass (100% by mass) of the flux.

<<Metal Deactivator>>

Examples of the metal deactivators include hindered phenolic compounds and nitrogen compounds.

The term "metal deactivator" herein refers to a compound having a capacity to prevent metal from deteriorating due to contact with a certain type of compound.

The hindered phenolic compound refers to a phenolic compound having a bulky substituent (for example, a branched or cyclic alkyl group such as a t-butyl group) on at least one of the ortho positions of phenol.

The hindered phenolic compound is not particularly limited, and examples thereof include bis[3-(3-tert-butyl-4-hydroxy-5-methylphenyl)propionic acid][ethylenebis(oxyethylene)], N,N'-hexamethylenebis[3-(3,5-di-tert-butyl-4-hydroxyphenyl)propanamide], 1,6-hexanediol bis[3-(3,5-di-tert-butyl-4-hydroxyphenyl)propionate], 2,2'-methylenebis[6-(1-methylcyclohexyl)-p-cresol], 2,2'-methylenebis(6-tert-butyl-p-cresol), 2,2'-methylenebis(6-tert-butyl-4-ethylphenol), triethylene glycol-bis[3-(3-tert-butyl-5-methyl-4-hydroxyphenyl)propionate], 1,6-hexanediol-bis-[3-(3,5-di-tert-butyl-4-hydroxyphenyl)propionate], 2,4-bis-(n-octylthio)-6-(4-hydroxy-3,5-di-t-butylanilino)-1,3,5-triazine, pentaerythrityl-tetrakis[3-(3,5-di-tert-butyl-4-hydroxyphenyl)propionate], 2,2-thio-diethylenebis[3-(3,5-di-tert-butyl-4-hydroxyphenyl)propionate], octadecyl-3-(3,5-di-tert-butyl-4-hydroxyphenyl)propionate, N,N'-hexamethylenebis(3,5-di-t-butyl-4-hydroxyhydrocinnamamide), 3,5-di-tert-butyl-4-hydroxybenzylphosphonate-diethyl ester, 1,3,5-trimethyl-2,4,6-tris(3,5-di-tert-butyl-4-hydroxybenzyl)benzene, N,N'-bis[2-[2-(3,5-di-tert-butyl-4-hydroxyphenyl)ethylcarbonyloxy]ethyl]oxamide, and a compound represented by the following chemical formula.

(In the formula, Z is an alkylene group that may be substituted. $R^{41}$ and $R^{42}$ are each independently an alkyl group, an aralkyl group, an aryl group, a heteroaryl group, a cycloalkyl group, or a heterocycloalkyl group, which may be substituted. $R^{43}$ and $R^{44}$ are each independently an alkyl group that may be substituted.)

Examples of the nitrogen compounds in the metal deactivator include hydrazide-based nitrogen compounds, amide-based nitrogen compounds, triazole-based nitrogen compounds, and melamine-based nitrogen compounds.

The hydrazide-based nitrogen compound may be any nitrogen compound having a hydrazide skeleton, and examples thereof include dodecanedioate bis[N2-(2-hydroxybenzoyl)hydrazide], N,N'-bis[3-(3,5-di-tert-butyl-4-hydroxyphenyl)propionyl]hydrazine, decanedicarboxylic acid disalicyloyl hydrazide, N-salicylidene-N'-salicylhydrazide, m-nitrobenzhydrazide, 3-aminophthalhydrazide, phthalic dihydrazide, adipic hydrazide, oxalobis(2-hydroxy-5-octylbenzylidene hydrazide), N'-benzoylpyrrolidonecarboxylic acid hydrazide, and N,N'-bis(3-(3,5-di-tert-butyl-4-hydroxyphenyl)propionyl)hydrazine.

The amide-based nitrogen compound may be any nitrogen compound having an amide skeleton, and examples thereof include N,N'-bis{2-[3-(3,5-di-tert-butyl-4-hydroxyphenyl)propionyloxy]ethyl}oxamide.

The triazole-based nitrogen compound may be any nitrogen compound having a triazole skeleton, and examples thereof include N-(2H-1,2,4-triazol-5-yl)salicylamide, 3-amino-1,2,4-triazole, and 3-(N-salicyloyl)amino-1,2,4-triazole.

The melamine-based nitrogen compound may be any nitrogen compound having a melamine skeleton, and examples thereof include melamine and melamine derivatives. More specifically, examples thereof include trisaminotriazine, alkylated trisaminotriazine, alkoxyalkylated trisaminotriazine, melamine, alkylated melamine, alkoxyalkylated melamine, N2-butylmelamine, N2,N2-diethylmelamine, and N,N,N',N',N'',N''-hexakis(methoxymethyl)melamine.

One metal deactivator may be used singly or two or more metal deactivators may be mixed and used.

The flux according to the present embodiment preferably does not contain a resin ingredient. In a case where the flux residue does not contain the resin ingredient, the flux residue is easily washed with water.

In the present specification, examples of the resin ingredient include rosin, a resin other than rosin, and the like.

In the present specification, the term "rosin" includes natural resins containing a mixture of abietic acid and its isomer with abietic acid as a main ingredient, and resins (sometimes referred to as rosin derivatives) which are obtained by chemically modifying natural resins.

Examples of the rosin derivatives include a purified rosin and a modified rosin.

Examples of the modified rosin include a hydrogenated rosin, a polymerized rosin, a polymerized hydrogenated rosin, a disproportionated rosin, an acid-modified rosin, a rosin ester, an acid-modified hydrogenated rosin, an acid anhydride-modified hydrogenated rosin, an acid-modified disproportionated rosin, an acid anhydride-modified disproportionated rosin, a phenol-modified rosin, an α,β unsaturated carboxylic acid-modified product (such as an acrylated rosin, a maleated rosin, and a fumarated rosin), purified products, hydrides, and disproportionated products of the polymerized rosin, purified products, hydrides, and disproportionated products of the α,β unsaturated carboxylic acid-modified product, a rosin alcohol, rosin amine, a hydrogenated rosin alcohol, a rosin ester, a hydrogenated rosin ester, a rosin soap, a hydrogenated rosin soap, and an acid-modified rosin soap.

Examples of the resin other than rosin include a terpene resin, a modified terpene resin, a terpene phenol resin, a modified terpene phenol resin, a styrene resin, a modified styrene resin, a xylene resin, a modified xylene resin, an acrylic resin, a polyethylene resin, an acrylic-polyethylene copolymer resin, other thermosetting resin, and the like.

Examples of the modified terpene resin include an aromatic modified terpene resin, a hydrogenated terpene resin, and a hydrogenated aromatic modified terpene resin. Examples of the modified terpene phenol resin include a hydrogenated terpene phenol resin. Examples of the modified styrene resin include a styrene acrylic resin and a styrene maleic acid resin. Examples of the modified xylene resin include a phenol-modified xylene resin, an alkylphenol-modified xylene resin, a phenol-modified resol-type xylene resin, a polyol-modified xylene resin, and a polyoxyethylene-added xylene resin.

Examples of the other thermosetting resins include an epoxy resin.

Examples of the epoxy resin include a bisphenol A type epoxy resin, a bisphenol F type epoxy resin, a bisphenol S type epoxy resin, a glycidylamine type resin, an alicyclic epoxy resin, an aminopropane type epoxy resin, a biphenyl type epoxy resin, a naphthalene type epoxy resin, an anthracene type epoxy resin, a triazine type epoxy resin, a dicyclopentadiene type epoxy resin, a triphenylmethane type epoxy resin, a fluorene type epoxy resin, a phenol aralkyl type epoxy resin, and a novolac type epoxy resin.

The flux according to the present embodiment described above contains a compound (AZ1) having a benzotriazole skeleton, an organic acid (AC1) having a rate of decrease in weight of 20% by mass or less in a case of being held at 140° C. for 15 minutes in a thermogravimetry, and a solvent (S1) having a rate of decrease in weight of 50% by mass or less in a case of being held at 140° C. for 15 minutes in a thermogravimetry. Therefore, both the solder wettability and the washability of the flux residue can be enhanced. The reason why such effect is obtained is not clear, but it is presumed as follows.

In a case where the specific azoles (AZ1) protect the copper bump surface of the board, the oxidation of the copper bump is suppressed.

In addition, in a case where the specific azoles (AZ1) protect the copper bump surface of the board, the reaction of the copper bump of the board with the activator in the flux is suppressed. As a result, a decrease in the activity of the flux is suppressed.

In addition, in a case where the specific azoles (AZ1) protect the copper bump surface of the board, the reaction of the copper bump of the board with the activator in the flux is suppressed. As a result, the generation of metal salts that are difficult to wash is suppressed.

In addition, in a case where the specific organic acid (AC1) is less likely to be volatilized by heating, the decrease in the activity of the activator is suppressed. In addition, in a case where the specific solvent (S1) is less likely to be volatilized by heating, the decrease in the activity of the activator is suppressed, and the curing of the flux residue is suppressed.

By these synergistic effects, according to the flux of the present embodiment, both the solder wettability and the washability of the flux residues can be enhanced.

(Solder Paste)

The flux according to the above embodiment is suitably used for the soldering by thermal compression bonding, but is not limited thereto, and can also be used for reflow soldering.

A solder paste of the present embodiment contains a solder alloy powder and the above-mentioned flux. The solder paste according to the present embodiment is suitably used for reflow soldering.

The solder alloy powder may be constituted of an Sn-only solder powder; or a powder of an Sn—Ag-based, Sn—Cu-based, Sn—Ag—Cu-based, Sn—Bi-based, or Sn—In-based solder alloy, or a powder of solder alloys in which Sb, Bi, In, Cu, Zn, As, Ag, Cd, Fe, Ni, Co, Au, Ge, P, or the like has been added to the above alloys.

The solder alloy powder may be constituted of a powder of an Sn—Pb-based solder alloy, or a powder of solder alloys in which Sb, Bi, In, Cu, Zn, As, Ag, Cd, Fe, Ni, Co, Au, Ge, P, or the like has been added to the Sn—Pb-based solder alloy.

The solder alloy powder is preferably a Pb-free solder.

Content of Flux:

The content of the flux in the solder paste is preferably 5% to 30% by mass and more preferably 5% to 15% by mass with respect to the total mass of the solder paste.

According to the solder paste according to the present embodiment described above, in a case of containing the flux that contains the compound (AZ1) having a benzotriazole skeleton, the specific organic acid (AC1), and the specific solvent (S1), both the wettability and the washability of the flux residue can be enhanced.

(Method for Manufacturing Joined Body)

The method for manufacturing a joined body according to the present embodiment includes a step of soldering by thermal compression bonding a component having a lead treated with solder to a soldering surface of a board treated with the flux according to the above embodiment to obtain a joined body.

A method for manufacturing a joined body according to the present embodiment will be described by taking an example of a method including a flux application step, a solder application step, a preheating step, and a soldering step.

<Flux Application Step>

Figure 1:
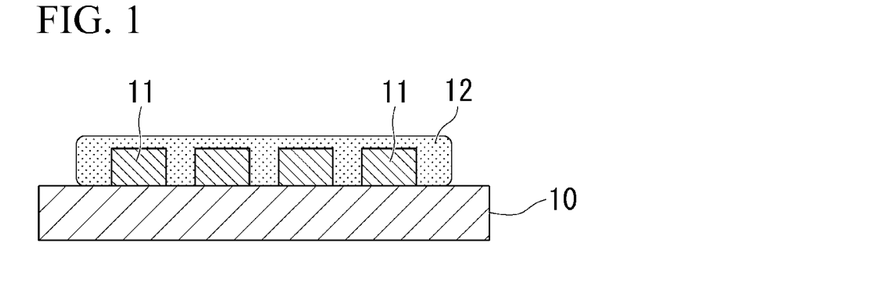
FIG. 1 is a cross-sectional view showing a board to which a flux is applied in soldering by thermal compression bonding.

The flux application step will be described with reference to FIG. 1. In the present step, the flux 12 is applied to the board 10 on which the copper bumps 11 are arranged to cover the copper bumps 11. As a result, as shown in FIG. 1, the copper bumps 11 are coated with the flux 12.

Examples of the board include a printed wiring board and the like.

As the flux 12, the flux according to the above embodiment is suitably used.

Examples of the flux application device include a spray fluxer, a foam fluxer, and the like. Among these, a spray fluxer is preferable from the viewpoint of the stability of the application amount.

The application amount of the flux is preferably 30 to 180 mL/m$^2$, more preferably 40 to 150 mL/m$^2$, and particularly preferably 50 to 120 mL/m$^2$ from the viewpoint of solderability.

<Solder Application Step>

Figure 2:
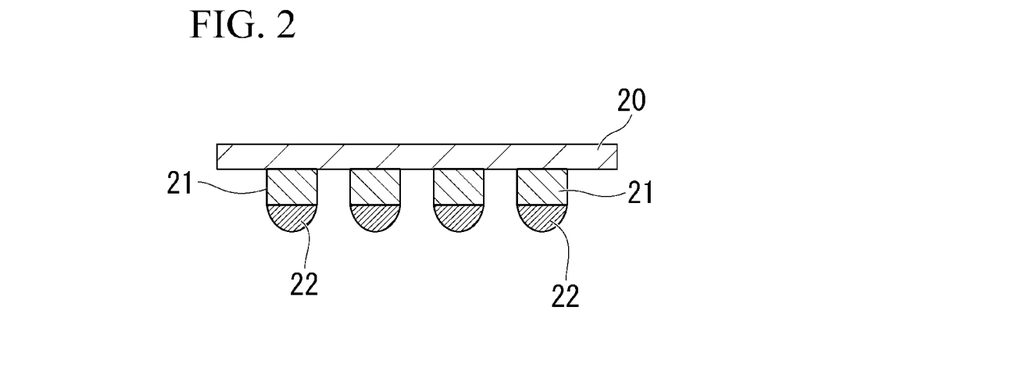
FIG. 2 is a cross-sectional view showing a component in which solder is applied to a lead in soldering by thermal compression bonding.

The solder application step will be described with reference to FIG. 2. In the present step, the lead 21 disposed on the soldering surface of the component 20 is brought into contact with the molten solder obtained by melting the solder alloy. Accordingly, as shown in FIG. 2, the lead 21 of the component 20 is coated with the solder 22.

Examples of the component include an integrated circuit, a transistor, a diode, a resistor, and a capacitor.

Examples of the solder alloy include those described above in <Solder paste>.

The method of bringing the molten solder into contact with the soldering surface may be any method as long as the molten solder can be brought into contact with the board, and is not particularly limited. Examples of such a method include a jetting method, a dipping method, and the like.

The jetting method is a method of bringing a soldering surface of a board on which a component is mounted into contact with a jetting molten solder. The dipping method is a method of bringing a soldering surface of a board on which a component is mounted into contact with a liquid surface of a stationary molten solder.

<Preheating Step>

In the preheating step, the board 10 treated with the flux in the flux application step is preheated.

In the preheating step, the temperature for heating the board 10 is preferably 80° C. to 160° C. and more preferably 100° C. to 140° C.

The pressure of the atmosphere during the preheating may be usually an atmospheric pressure. The atmosphere during the preheating is preferably a N2 atmosphere, and the oxygen concentration is preferably 10,000 ppm or less. The time for the preheating is preferably 20 minutes or less and more preferably 10 minutes or less.

<Soldering Step>

Figure 3:
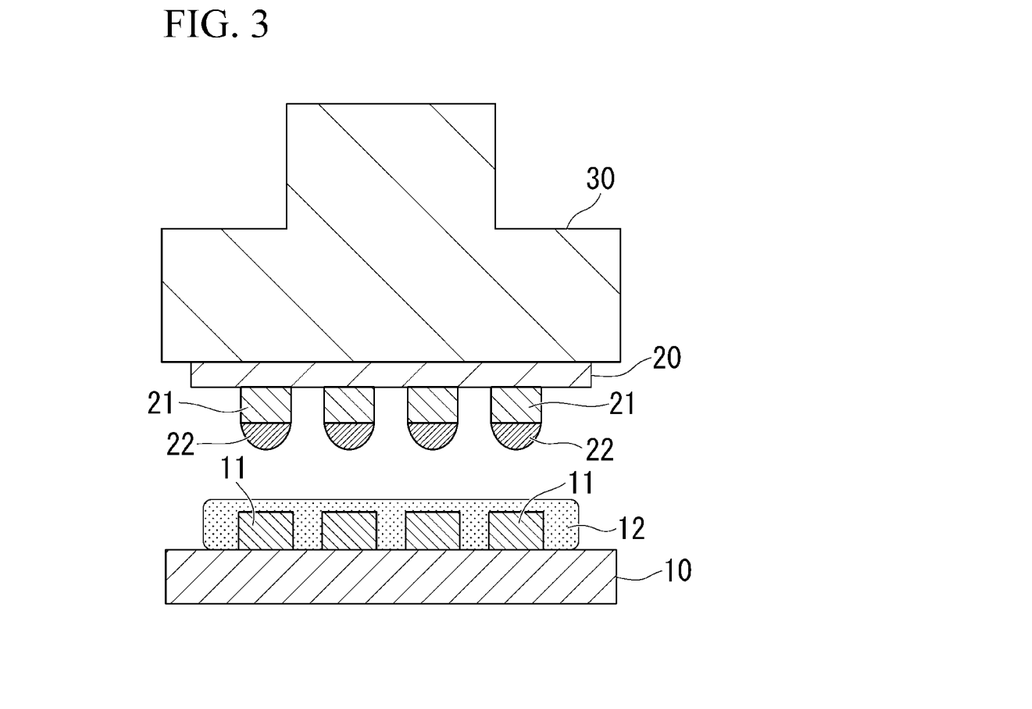
FIG. 3 is a cross-sectional view showing a state in which a position of the component to which the solder is applied and a position the board to which the flux is applied are aligned in soldering by thermal compression bonding.

In the soldering step, first, as shown in FIG. 3, the component 20 on which the lead 21 is disposed and the board 10 on which the copper bumps 11 are arranged (after preheating), are disposed such that the copper bumps 11 and the lead 21 face each other.

Figure 4:
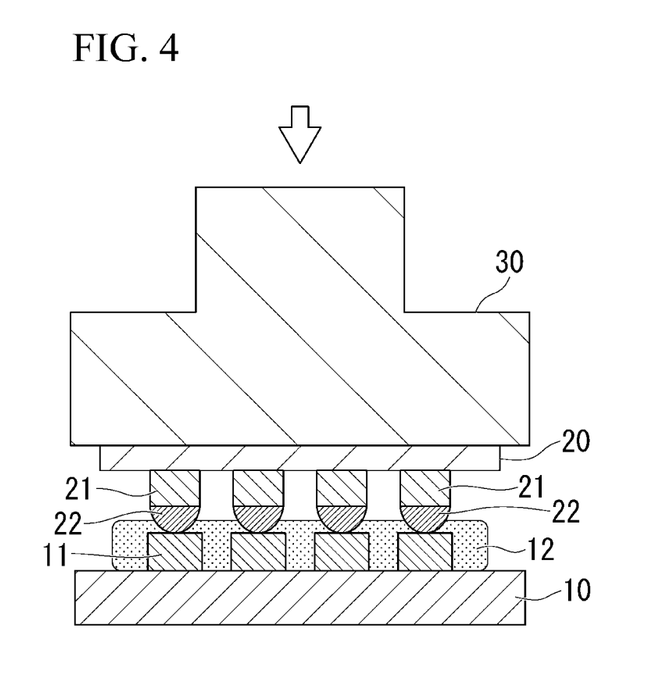
FIG. 4 is a cross-sectional view showing a state in which the component to which the solder is applied and the board to which the flux is applied are soldered by thermal compression bonding in soldering by thermal compression bonding.

Next, as shown in FIG. 4, in a case of applying pressure in the direction of the arrow in FIG. 4 using the bonding head 30 to perform thermal compression bonding, the lead 21 on the component 20 and the copper bump 11 on the board 10 are soldered to each other to obtain a joined body.

In the thermal compression bonding, the temperature for heating the component 20 is 250° C. to 320° C. and preferably 280° C. to 300° C.

The pressure of the atmosphere during the thermal compression bonding may be usually an atmospheric pressure. The atmosphere during the preheating is preferably a $N_2$ atmosphere, and the oxygen concentration is preferably 100 ppm or less.

The joining pressure at the time of thermal compression bonding is not particularly limited as long as the component and the board, which are to be joined, are not damaged, and can be appropriately set by those skilled in the art.

According to the method for manufacturing a joined body according to the present embodiment described above, it is possible to enhance both the wettability of the solder 22 with respect to the copper bumps 11 and the washability of the flux residues on the obtained joined body. As a result, it is possible to improve the reliability of the joined portion of the obtained joined body.

EXAMPLES

Hereinafter, the present invention will be described with reference to Examples, but the present invention is not limited to the following Examples.

<Preparation of Flux>

Examples 1 to 20 and Comparative Examples 1 to 5

Each of fluxes of examples and comparative examples was blended using the compositions shown in Tables 1 to 3.

Raw materials used are described below. The rate of decrease in weight of the organic acid, the solvent, and the amine was measured as follows.

Using a simultaneous thermogravimetric differential thermal analyzer (TG-DTA8122 manufactured by Rigaku Corporation), 10 mg of a sample to be measured was put in an aluminum pan, and heating was started to increase the temperature to 140° C. at 1° C./sec, and the temperature was held at 140° C. for 15 minutes. Then, the rate of decrease in weight was calculated from the mass (100% by mass) of the target sample before heating and the mass after holding at 140° C. for 15 minutes by the following calculation formula.

Rate of decrease in weight (%)=100×{(mass of target sample before heating)−(mass after holding at 140° C. for 15 minutes)}/(mass of target sample before heating)

Specific Azoles (AZ1):
benzotriazole, 5-methylbenzotriazole, and 2-(2'-hydroxy-5'-methylphenyl)benzotriazole.

Other Azoles:
5-phenyltetrazole and 2-methylimidazole.

Specific organic acid (AC1): diglycolic acid (rate of decrease in weight of less than 1% by mass), and citric acid (rate of decrease in weight of less than 1% by mass).

Other organic acids: malonic acid (rate of decrease in weight of 37% by mass)

Specific solvent (S1): polyethylene glycol (average molecular weight of 400) (rate of decrease in weight of less than 1% by mass), ethylene oxide-resorcin copolymer (rate of decrease in weight of less than 1% by mass; manufactured by Matsumura Oil Co., Ltd., GR-175)

Other solvents: hexylene glycol (rate of decrease in weight of 99% by mass or more)

Amine: N,N,N',N'-tetrakis(2-hydroxypropyl)ethylenediamine (rate of decrease in weight of less than 1% by mass), a bis(2-aminopropyl)ether polyethylene glycol-polypropylene glycol copolymer (rate of decrease in weight of less than 1% by mass; manufactured by Huntsman International LLC., ED-600)

Water-soluble base agent: PEG-4000S (number average molecular weight of 3,400, manufactured by Sanyo Chemical Industries, Ltd.)

<Preparation of Solder Paste>

Each of the fluxes of each of the examples and the following solder alloy powders were mixed to blend solder pastes. In all of the blended solder pastes, the flux was 10.5% by mass, and the solder alloy powder was 89.5% by mass.

The solder alloy powder in the solder paste is a powder consisting of a solder alloy containing 3% by mass of Ag, 0.5% by mass of Cu, and the remainder of Sn.

The solder alloy powder has a size (particle size distribution) satisfying symbol 6 in the powder size classification (Table 2) in JIS Z 3284-1:2014.

For the flux prepared above, <<Evaluation of solder wettability>> was performed according to the evaluation method described in the following <Evaluation>.

In addition, for the solder pastes prepared above, <<Evaluation of washability of flux residues>> was performed according to the evaluation method described in the following <Evaluation>.

<Evaluation>
<<Evaluation of Solder Wettability>>
Verification Method:

The wetting speed of the solder was evaluated according to the method of a meniscograph test.

Each of the fluxes of Examples 1 to 20 and Comparative Examples 1 to 5 was applied to a copper plate (width 5 mm× length 25 mm× thickness 0.5 mm) plated with NiPdAu. The copper plate to which the flux was applied was heat-treated at 120° C. for 15 minutes in an air atmosphere to obtain a test plate. Five of such test plates were prepared for each of Examples and Comparative Examples.

Each of the obtained test plates was dipped in a solder bath to obtain a zero cross time (sec). Here, the evaluation was performed as follows using a Solder Checker SAT-5200 (manufactured by RHESCA CO., LTD.) as a test device and Sn-0.5Cu (numerical value is % by mass) as a solder. The solder wettability was evaluated by the average value of the zero cross time (sec) of the five test plates of each of Examples and Comparative Examples. The test conditions were set as follows.

Dipping speed into solder bath: 10 mm/sec
Dipping depth into solder bath: 3 mm
Dipping time in solder bath: 10 sec
Solder bath temperature: 280° C.

As the average value of the zero cross times (sec) become shorter, the wetting speed becomes faster, which means that the solder wettability is favorable.

Determination Criteria:
A: The average value of zero cross times (sec) is 2 seconds or less.
B: The average value of zero cross times (sec) is more than 2 seconds and 3 seconds or less.
C: The average value of zero cross times (sec) is more than 3 seconds.

The flux with an evaluation result of A or B was regarded as acceptable, and the flux with an evaluation result of C was regarded as unacceptable.

The results of Examples 1 to 20 and Comparative Examples 1 to 5 are shown in Tables 1 to 3.

<<Evaluation of Washability of Flux Residue>>
Verification Method:

A glass epoxy board (width 30 mm×length 30 mm) was prepared in which a copper land (width 30 mm× length 30 mm) plated with NiPdAu was provided on the entire surface. First, 15 mg of each of the fluxes of Examples 1 to 20 and Comparative Examples 1 to 5 was applied to the center of the copper land. Next, about 0.2 g of a ring solder having a composition of Ag of 3% by mass, Cu of 0.5% by mass, and a remainder of Sn was placed on each of the applied fluxes. Next, the glass epoxy board on which the flux and the ring solder were mounted was heated on a hot plate at 120° C. for 15 minutes. Next, the board was heated on a hot plate in a nitrogen atmosphere at 300° C. for 10 seconds.

Next, the heated glass epoxy board was dipped in a washing liquid at 80° C., and ultrasonic waves were applied for 5 minutes. As the washing liquid, ion-exchanged water was used. Subsequently, the presence or absence of flux residues on the washed glass epoxy board was confirmed, and the evaluation was performed based on the following determination criteria.

Determination Criteria:
A: No flux residue was observed on the glass epoxy board.
B: A small amount of flux residue was observed on the glass epoxy board.
C: A large amount of flux residues were observed on the glass epoxy board.

The results of Examples 1 to 20 and Comparative Examples 1 to 5 are shown in Tables 1 to 3.

TABLE 1

| | | | Example 1 | Example 2 | Example 3 | Example 4 | Example 5 | Example 6 | Example 7 |
|---|---|---|---|---|---|---|---|---|---|
| Azoles (AZ) | AZ1 | Benzotriazole | 2 | | | 2 | 2 | 2 | 2 |
| | | 5-Methylbenzotriazole | | 2 | | | | | |
| | | 2-(2'-Hydroxy-5'-methylphenyl)benzotriazole | | | 2 | | | | |
| | Other AZ | 5-Phenyltetrazole | | | | | | | |
| | | 2-Methylimidazole | | | | | | | |
| Organic acid (AC) | AC1 | Diglycolic acid | 5 | 5 | 5 | 5 | 5 | 5 | 5 |
| | | Citric acid | | | | | | | |
| | Other AC | Malonic acid | | | | | | | |
| Solvent (S) | S1 | Polyethylene glycol (molecular weight 400) | 53 | 53 | 53 | 53 | | 38 | 26.5 |
| | | Ethylene oxide-resorcin copolymer | | | | | 53 | | |
| | Other | Hexylene glycol | | | | | | | 26.5 |

TABLE 1-continued

|  |  |  | Example 1 | Example 2 | Example 3 | Example 4 | Example 5 | Example 6 | Example 7 |
|---|---|---|---|---|---|---|---|---|---|
|  | S1 Amine | N,N,N',N'-tetrakis(2-hydroxypropyl)ethylenediamine | 40 | 40 | 40 |  | 40 | 40 | 40 |
|  |  | bis(2-aminopropyl) ether polyethylene glycol-polypropylene glycol copolymer |  |  |  | 40 |  |  |  |
|  | Water-soluble base agent | PEG-4000S |  |  |  |  |  | 15 |  |
|  |  | AC1/AZ1 (mass ratio) | 2.5 | 2.5 | 2.5 | 2.5 | 2.5 | 2.5 | 2.5 |
|  |  | Total (% by mass) | 100 | 100 | 100 | 100 | 100 | 100 | 100 |
| Evaluation result |  | Wettability of solder | A | A | A | A | A | A | A |
|  |  | Washability of flux residue | A | A | A | A | A | A | A |

TABLE 2

|  |  |  | Example 8 | Example 9 | Example 10 | Example 11 | Example 12 | Example 13 | Example 14 | Example 15 | Example 16 |
|---|---|---|---|---|---|---|---|---|---|---|---|
| Azoles (AZ) | AZ1 | Benzotriazole | 2 | 2 | 2 | 2 | 2 | 2 | 2 | 2 | 2 |
|  |  | 5-Methylbenzotriazole |  |  |  |  |  |  |  |  |  |
|  |  | 2-(2'-Hydroxy-5'-methylphenyl)benzotriazole |  |  |  |  |  |  |  |  |  |
|  | Other AZ | 5-Phenyltetrazole |  |  |  |  |  |  |  |  |  |
|  |  | 2-Methylimidazole |  |  |  |  |  |  |  |  |  |
| Organic acid (AC) | AC1 | Diglycolic acid |  | 2.5 | 2 | 15 | 20 | 10 | 5 | 5 | 2.5 |
|  |  | Citric acid | 5 |  |  |  |  |  |  |  |  |
|  | Other AC | Malonic acid |  | 2.5 |  |  |  |  |  |  |  |
| Solvent (S) | S1 | Polyethylene glycol (molecular weight 400) | 53 | 53 | 56 | 43 | 38 | 88 | 33 | 23 | 28 |
|  |  | Ethylene oxide-resorcin copolymer |  |  |  |  |  |  |  |  | 25 |
|  | Other S1 | Hexylene glycol |  |  |  |  |  |  |  |  |  |
|  | Amine | N,N,N',N'-tetrakis(2-hydroxypropyl)ethylenediamine | 40 | 40 | 40 | 40 | 40 |  | 60 | 70 | 20 |
|  |  | bis(2-aminopropyl) ether polyethylene glycol-polypropylene glycol copolymer |  |  |  |  |  |  |  |  | 20 |
|  | Water-soluble base agent | PEG-4000S |  |  |  |  |  |  |  |  |  |
|  |  | AC1/AZ1 (mass ratio) | 2.5 | 1.25 | 1 | 7.5 | 10 | 5 | 2.5 | 2.5 | 2.5 |
|  |  | Total (% by mass) | 100 | 100 | 100 | 100 | 100 | 100 | 100 | 100 | 100 |
| Evaluation result |  | Wettability of solder | A | A | B | A | A | B | A | A | A |
|  |  | Washability of flux residue | A | A | A | A | B | A | A | B | A |

TABLE 3

|  |  |  | Example 17 | Example 18 | Example 19 | Example 20 | Comparative Example 1 | Comparative Example 2 | Comparative Example 3 | Comparative Example 4 | Comparative Example 5 |
|---|---|---|---|---|---|---|---|---|---|---|---|
| Azoles (AZ) | AZ1 | Benzotriazole | 0.5 | 0.2 | 10 | 15 |  |  |  | 2 | 2 |
|  |  | 5-Methylbenzotriazole |  |  |  |  |  |  |  |  |  |
|  |  | 2-(2'-Hydroxy-5'-methylphenyl)benzotriazole |  |  |  |  |  |  |  |  |  |
|  | Other AZ | 5-Phenyltetrazole |  |  |  |  |  |  | 2 |  |  |
|  |  | 2-Methylimidazole |  |  |  |  |  |  |  |  | 2 |

TABLE 3-continued

|  |  |  | Example 17 | Example 18 | Example 19 | Example 20 | Comparative Example 1 | Comparative Example 2 | Comparative Example 3 | Comparative Example 4 | Comparative Example 5 |
|---|---|---|---|---|---|---|---|---|---|---|---|
| Organic acid (AC) | AC1 | Diglycolic acid | 5 | 5 | 5 | 5 | 5 | 5 | 5 |  | 5 |
|  |  | Citric acid |  |  |  |  |  |  |  |  |  |
|  | Other AC | Malonic acid |  |  |  |  |  |  |  | 5 |  |
| Solvent (S) | S1 | Polyethylene glycol (molecular weight 400) | 54.5 | 54.8 | 45 | 40 | 55 | 53 | 53 | 53 |  |
|  |  | Ethylene oxide-resorcin copolymer |  |  |  |  |  |  |  |  |  |
|  | Other S1 | Hexylene glycol |  |  |  |  |  |  |  |  | 53 |
| Amine |  | N,N,N',N'-tetrakis(2-hydroxypropyl) ethylenediamine | 40 | 40 | 40 | 40 | 40 | 40 | 40 | 40 | 40 |
|  |  | bis(2-aminopropyl) ether polyethylene glycol-polypropylene glycol copolymer |  |  |  |  |  |  |  |  |  |
| Water-soluble base agent |  | PEG-4000S |  |  |  |  |  |  |  |  |  |
|  |  | AC1/AZ1 (mass ratio) | 10 | 25 | 0.5 | 0.333 | — | — | — | 0 | 2.5 |
|  |  | Total (% by mass) | 100 | 100 | 100 | 100 | 100 | 100 | 100 | 100 | 100 |
| Evaluation result |  | Wettability of solder | A | B | A | B | B | B | B | C | C |
|  |  | Washability of flux residue | A | B | A | B | C | C | C | A | C |

In all of the fluxes of Examples 1 to 20 containing the specific azoles (AZ1), the specific organic acid (AC1), and the specific solvent (S1), evaluation of solder wettability was A or B and evaluation of washability of flux residues was A or B.

On the other hand, in the fluxes of Comparative Examples 1 to 3 containing no specific azoles (AZ1), evaluation of washability of flux residues was C. In addition, in the flux of Comparative Example 4 containing no specific organic acid (AC1), evaluation of solder wettability was C. In addition, in the flux of Comparative Example 5 containing no specific solvent (S1), evaluation of solder wettability was C and evaluation of washability of flux residues was C.

INDUSTRIAL APPLICABILITY

According to the present invention, it is possible to provide a flux and a solder paste in which both the solder wettability and the washability of flux residues are enhanced. In particular, this flux can be suitably used as a flux for soldering accompanied by thermal compression bonding.

REFERENCE SIGNS LIST

10: Board
11: Copper bump
12: Flux
20: Component
21: Lead
22: Solder
30: Bonding head

What is claimed is:
1. A flux consisting of:
a compound AZ1 having a benzotriazole skeleton;
an organic acid AC1 having a rate of decrease in weight of 20% by mass or less in a case of being held at 140° C. for 15 minutes in a thermogravimetry;
a solvent (S1), and
optionally one or more compounds selected from the group consisting of azoles other than the compound AZ1 and selected from group A, organic acids other than the organic acid AC1 and selected from group B, solvents other than the solvent (S1) and selected from group C, an amine, a halogen compound, a water-soluble base agent, and a metal deactivator;
wherein the flux does not have a resin ingredient;
wherein the solvent (S1) has a rate of decrease in weight of 50% by mass or less in a case of being held at 140° C. for 15 minutes in a thermogravimetry, the solvent (S1) is one or more selected from the group consisting of an alcohol-based solvent, a glycol-based solvent, a glycol ether-based solvent, and polyalkylene glycols; and the alcohol-based solvent is not a terpineol;
wherein a proportion of a total amount of the organic acid AC1 with respect to a total amount of the compound AZ1 is 0.5 to 10 by mass ratio;
wherein group A consists of pyrroles, imidazoles, pyrazoles, 1,2,4-triazoles, tetrazoles, and benzimidazoles;
wherein group B consists of eicosanedioic acid, glycolic acid, salicylic acid, dipicolinic acid, dibutylaniline diglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tris(2-carboxyethyl) isocyanuric acid, glycine, 1,3-cyclohexanedicarboxylic acid, 2,3-dihydroxybenzoic acid, 2,4-diethylglutaric acid, 2-quinolinecarboxylic acid, 3-hydroxybenzoic acid, propionic acid, p-anisic acid, stearic acid, 12-hydroxystearic acid, oleic acid, linoleic acid, linolenic acid, palmitic acid, a dimer acid, a trimer acid, a hydrogenated dimer acid, and a hydrogenated trimer acid; and
wherein group C consists of isopropyl alcohol, 1,2-butanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1-ethynyl-1-cyclohexanol, hexylene glycol, and 1,3-butylene glycol.

2. The flux according to claim 1,
wherein the compound AZ1 includes one or more compounds selected from the group consisting of a compound represented by General Formula (AZ1-1) and a compound represented by General Formula (AZ1-2), in the formulae, $R^{11}$ represents an organic group or a hydrogen atom, $R^{12}$ represents a substituent, n1 represents an integer in a range of 0 to 4, $R^{21}$ represents an organic group or a hydrogen atom, $R^{22}$ represents a substituent, and n2 represents an integer in a range of 0 to 4.

3. The flux according to claim 1,
wherein a content of the compound AZ1 is 0.2% to 15% by mass with respect to a total mass (100% by mass) of the flux.

4. The flux according to claim 1,
wherein a content of the organic acid AC1 is 2% to 20% by mass with respect to a total mass (100% by mass) of the flux.

5. A solder paste comprising:
a solder alloy powder; and
the flux according to claim 1.

6. The flux according to claim 1,
wherein a content of the amine is more than 0% and 70% or less by mass with respect to a total mass (100% by mass) of the flux.

* * * * *